United States Patent
Nakamura et al.

(10) Patent No.: US 6,922,899 B2
(45) Date of Patent: Aug. 2, 2005

(54) ROTARY ENCODER

(75) Inventors: Yutaka Nakamura, Kanagawa (JP); Satoshi Yanobe, Kanagawa (JP)

(73) Assignee: Sokkia Co., Ltd., Atsugi (JP)

( * ) Notice: Subject to any disclaimer, the term of this patent is extended or adjusted under 35 U.S.C. 154(b) by 0 days.

(21) Appl. No.: 10/726,639

(22) Filed: Dec. 4, 2003

(65) Prior Publication Data

US 2004/0107586 A1 Jun. 10, 2004

(30) Foreign Application Priority Data

Dec. 9, 2002 (JP) ........................................ 2002-356593

(51) Int. Cl.[7] .............................................. G01B 7/30
(52) U.S. Cl. ........................................ 33/1 PT; 33/1 N
(58) Field of Search .............................. 33/1 PT, 1 N, 33/534, 706, 707

(56) References Cited

U.S. PATENT DOCUMENTS 5,101,102 A * 3/1992 Nishimura et al. ..... 250/231.16
5,435,067 A * 7/1995 Uchida et al. .............. 33/1 PT
6,622,391 B1 * 9/2003 Shirai et al. .................. 33/292
6,774,355 B2 * 8/2004 Kudo ..................... 250/231.13

FOREIGN PATENT DOCUMENTS

| JP | 11-173846 | 7/1999 |
| JP | 2001-264119 | 9/2001 |
| JP | 2002-202157 | 7/2002 |
| JP | 2002-286508 | 10/2002 |
| WO | WO 89/12213 | 12/1989 |

* cited by examiner

*Primary Examiner*—Christopher W. Fulton
*Assistant Examiner*—Tania Courson
(74) *Attorney, Agent, or Firm*—Arent Fox PLLC

(57) ABSTRACT

There is provided a rotary encoder which can eliminate an angle error caused by an eccentricity from a measured angle without strictly adjusting hardware and which can also eliminate a graduation error. Detection of a rotation angle of the rotating section and measurement of an error E ($\theta_n$) included in the detected angle θ are performed in advance, an error function E(θ) represented by a periodic function of the detected angle θ is calculated on the basis of these values, a storing means for storing the periodic function of the calculated error E(θ) is arranged, and an angle obtained by subtracting a value obtained by substituting the detected angle θa for variables in the error function E(θ) from the detected angle θa is displayed on a display unit.

2 Claims, 2 Drawing Sheets

ROTARY ENCODER

BACKGROUND OF THE INVENTION

1. Field of the Invention

The present invention relates to a rotary encoder which detects a rotation angle of a rotating section with reference to a fixed section.

2. Description of the Related Art

As a rotary encoder of this type, a rotary encoder comprising a graduation disk (rotating section), a light-emitting section for irradiating light on the graduation disk, and a light-receiving section (fixed section) for receiving light emitted from the light-emitting section and transmitted through the graduation disk is known. The rotary encoder detects a rotation angle of the graduation disk on the basis of a signal output depending on the light received by the light-receiving section. In general, in the rotary encoder, when the center of the graduation disk is eccentric from an actual rotating center, or when the graduation disk is not perpendicular to the rotating axis, an angular error is generated. An angular error is also generated due to the size of the graduation interval or graduation errors such as a systematic distortion for the circumference of the graduation disk. With respect to these errors, in Patent Document 1, a technique which arranges a plurality of combinations of code patterns and light-receiving elements on the circumference at almost equal intervals to remove these errors is disclosed.

[Patent Document 1]

Japanese Patent Application Laid-Open No. H6-313719

In the conventional rotary encoder, in order to reduce an angular error etc. caused by an eccentricity, an inclination of the graduation disk etc., the center position of the graduation disk and the inclination must be adjusted, and time cost is very excessive. The adverse affect of this graduation error cannot be easily reduced by adjusting hardware. When the rotary encoder is applied to a surveying instrument etc., the following method must be chosen. That is, an angle is measured a plurality of times, the positions of graduations read in the respective angle measurements are shifted from each other, and the measurement values are averaged (pairs of observations), so that the adverse affect of the graduation error is reduced. A technique in which a plurality of combinations of code patterns and light-receiving elements are arranged on a circumference at almost equal intervals to eliminate these errors is expensive. The number of combinations arranged on the circumference is limited, and adjustment of these combinations disadvantageously requires a long time.

SUMMARY OF THE INVENTION

The present invention has been made in consideration of the above problems, and has as its object to provide a rotary encoder (including an incremental encoder and an absolute encoder) which can eliminate an angle error caused by an eccentricity from a measured angle without strictly adjusting hardware and which can also eliminate a dividing error by graduation.

In order to solve the above problems, according to the present invention, there is provided a rotary encoder includes: a fixed section; a rotating section which can be rotated with reference to the fixed section; angle detecting means for detecting a rotation angle of the rotating section with reference to a predetermined reference position of the rotating section; and output means for outputting the detected angle, wherein, when the angle detecting means detects an angle $\theta n = n \times \theta s$ ($n = 1, 2, \ldots, N$ (where $N \times \theta s = 360°$)) which is an integer multiple of a predetermined angle $\theta s$ ($\theta s \geq$ output resolution) such that the rotating section is rotated, an angle error $E(\theta n)$ included in the detected angle $\theta n$ is measured, functions between the detected angles $\theta n$ and errors $E(\theta n)$ are defined by the following equation with respect to all n, $$E(\theta n) = \sum_{i=1}^{N/2} A_i \cdot \sin(i\theta n + \phi_i)$$

an amplitude $A_i$ and an initial phase $\phi_i$ ($i = 1, 2, \ldots, N/2$ or $(N-1)/2$) are calculated such that all the defined equations are satisfied, storing means for storing an error function which is given by the following equation:

$$E(\theta) = \sum_{i=1}^{N/2} A_i \cdot \sin(i\theta + \phi_i)$$

and which is a periodic function of a detected angle $\theta a$ having the calculated amplitude $A_i$ and the calculated initial phase $\phi_i$ as coefficients is arranged, the detected angle $\theta a$ detected by the angle detection means is substituted for the variables $\theta$ in the equation of the error function $E(\theta)$ stored by the storing means, and a value obtained by subtracting the value $E(\theta a)$ obtained by the substitution from the detected angle $\theta a$ is outputted by the output means.

This operation is performed in consideration of the periodicity of the error included in the angle detected by the rotary encoder. According to this, an error function is calculated on the basis of the error included in the detected angle of the rotary encoder which is measured in advance, and the detected angle is corrected on the basis of the calculated error function. For this reason, even though adjustment of hardware for reducing the eccentricity and the inclination of the graduation disk is not strictly performed, an angle error caused by an eccentricity etc. and a graduation error are eliminated by the correction using the error function, and an accurate angle can be obtained.

Even though a cause of an error is not known, when the tendency of the error period can be known, the adverse affect of the error can be efficiently removed, and accurate angle measurement can be performed. Furthermore, the error functions $E(\theta)$ using the amplitudes $A_i$ and the initial phases $\phi_i$ with respect to all the orders i ($= 1, 2, \ldots, N/2$ or $(N-1)/2$) are not stored by the storing means, and an error function $E(\theta)$ using at least one amplitude $A_{k1}, A_{k2}, \ldots, A_{km}$ and at least one initial phase $\phi_{k1}, \phi_{k2}, \ldots, \phi_{km}$ (k1, k2, ..., km is at least one of natural numbers from 1 to N/2 or (N-1)/2) may be stored by the storing means. In this manner, when the order of the error function is appropriately selected, only the component of a cycle having a large error amplitude can be selected, and measurement and correction of an angle error can be efficiently performed in accordance with an accuracy of respective targets.

DESCRIPTION OF REFERENCE NUMERALS

2: Main graduation
3: Light-emitting section
4: Subgraduation
5: Light-receiving section

DETAILED DESCRIPTION OF THE PREFERRED EMBODIMENTS

Figure 1:
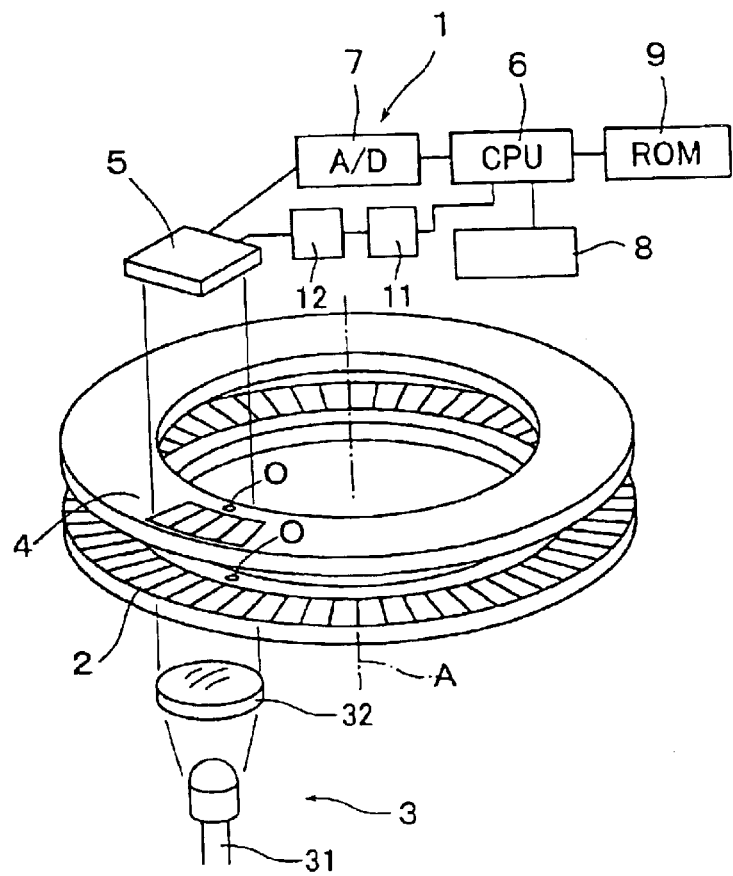
FIG. 1 is a perspective view showing a conventional incremental encoder.

Referring to FIG. 1, reference numeral 1 denotes an incremental rotary encoder. The rotary encoder 1 comprises a main graduation (rotating section) 2 fixed to a rotating shaft A, a light-emitting section 3, fixed on a bearing (not shown) of the rotating shaft, for irradiating light on the main graduation 2, a subgraduation 4 fixed to a position where the light emitted from the light-emitting section 3 is transmitted through the main graduation 2, and a light-receiving section (fixed section) 5 for receiving the light emitted from the light-emitting section 3 and transmitted through the main graduation 2 and the subgraduation 4.

The rotary encoder 1 comprises a CPU 6. The CPU 6 is connected to the light-receiving section 5 through a counter 11, a waveform shaper 12, and an A/D converter 7. A display unit (display means) 8 for displaying a calculation result of the CPU 6, an angle of the rotary encoder 1 etc., and a ROM (storing means) 9 for storing a control program of the CPU 6, various data, and the like are connected to the CPU 6.

In the main graduation 2, graduation slits having equal widths and equal intervals are formed throughout the circumference. In the subgraduation 4, graduation slits having widths and intervals which are equal to those of the main graduation 2 are formed at least one part. The light-emitting section 3 comprises a light-emitting diode 31 and a collimation lens 32. Light from the light-emitting diode 31 is converted into parallel beams by the collimation lens 32, and the parallel beams are irradiated on the main graduation 2. The light-receiving section 5 comprises a photoelectric conversion element (not shown). The light-receiving section 5 outputs electric signals depending on light-and-shade patterns formed when the light from the light-emitting section 3 is transmitted through the graduation slits of the main graduation 2 and the subgraduation 4. In this embodiment, when the light-receiving section 5, the subgraduation 4, and the light-emitting section 3 are fixed to the main body, and the main graduation 2 is rotated. However, in contrast to this, the main graduation 2 may be fixed, and the light-receiving section 5, the subgraduation 4, and the light-emitting section 3 may be rotated.

In the main graduation 2 and the subgraduation 4, one or more origin position graduation O is formed at each of the positions which correspond to each other and which are near the slits. A position where the two origin position graduations O of the main graduation 2 and the subgraduation 4 face each other is defined as an origin position of the main graduation 2. When the light from the light-emitting section 3 are transmitted through the two origin position graduations O of the main graduation 2 and the subgraduation 4 and then received by the light-receiving section 5, the light-receiving section 5 outputs an origin position signal to the CPU 6. The rotation angle of the main graduation 2 is detected on the basis of the origin position.

The detected angle of the rotary encoder according to the embodiment includes an error. Therefore, when error correction is performed, an accurate encoder can be obtained. As causes of errors, an eccentricity, an inclination of a graduation disk, and the like are conceivable. These errors can be reduced by mechanical adjustment. However, an graduation error cannot be reduced by mechanical adjustment, and an accurate graduation disk must be formed.

In the ROM 9, not only the control program of the CPU 6, but also a general form:

$$E(\theta) = \sum_{i=1}^{N/2} A_i \cdot \sin(i\theta + \phi_i)$$

($A_i$ is an amplitude, and $\phi_i$ is an initial phase) representing a correlation between the detected angle $\theta a$ detected by the CPU 6 on the basis of an electric signal from the light-receiving section 5 and the origin position signal and the error $E(\theta a)$ included in the detected angle $\theta a$ are stored. The error function $E(\theta)$ is a periodic function of the detected angle $\theta$, and the amplitude $A_i$ and the initial phase $\phi_i$ are calculated by the procedure described below. The error function $E(\theta)$ may include a constant term $A_o$ of Fourier series. Correction of an angle error caused when the rotary encoder 1 is incorporated to measure a horizontal angle of a total station T will be described below.

Figure 2:
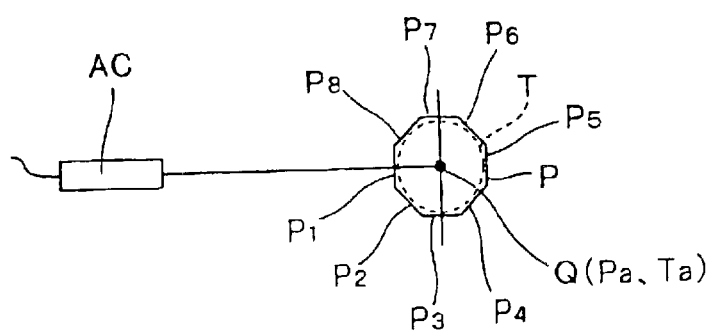
FIG. 2 is a plan view showing an inspection system by a polygon mirror and an autocollimator.

As shown in FIG. 2, a vertical axis $T_a$ of the total station T and a rotation center axis $P_a$ of a polygon mirror P are connected such that the vertical axis $T_a$ is almost matched with the rotation center axis $P_a$, and an autocollimator AC is arranged to measure a reflective surface $P_n$ (n=1, 2, ..., 8) of the polygon mirror P. For the descriptive convenience, when the total station T outputs an origin $\theta_o$ of the rotary encoder E incorporated in the vertical axis, it is assumed that the rotation angles of the total station T and the polygon mirror P are matched with each other such that a first surface $P_1$ of the reflective surface P of the polygon mirror correctly faces the autocollimator AC.

The vertical axis of the total station T is rotated such that the reflective surfaces $P_1$ to $P_8$ of the polygon mirror P correctly faces the autocollimator AC. Measured angles $\theta_n$ of the total station T (rotary encoder 1) and output values $\delta_n$ of the autocollimator are measured, respectively.

At this time, an angle error $E(\theta_n)$ included in the rotary encoder E can be expressed by:

$$E(\theta_n) = \theta_n - \frac{360°}{N}(n-1) - \delta_n$$

Fourier series expansion is performed by using the angle error $E(\theta_n)$ obtained as described above to obtain an error function below:

$$E(\theta) = \sum_{i=1}^{N/2} A_i \cdot \sin(i\theta + \phi_i)$$

In this case, when an angle $360° \times (n-1)/N$ between the first surface $P_1$ and the reflective surface $P_n$ of the polygon mirror P has an error $\sigma_n$, the polygon mirror P is corrected in advance, and the angle between the reflective surface $P_n$ and the first surface $P_1$ of the polygon mirror P is given by $360° \times (n-1)/N + \sigma_n$. In this manner, the angle error $E(\theta_n)$ of the rotary encoder E can be obtained at a high accuracy.

Even though the polygon mirror P cannot be corrected in advance, when the rotary encoder E outputs an origin $\theta_o$, the reflective surfaces $P_n$ of the polygon mirror P which correctly face the autocollimator AC are sequentially switched to measure N functions $E(\theta_n)$. An average of the N measured functions $E(\theta_n)$ is calculated, so that the adverse affect of the error $\sigma_n$ held by the reflective surfaces $P_n$ of the polygon mirror P can be suppressed.

An angle measuring process in the rotary encoder 1 will be described below.

When an angle measurement is performed by the total station, an error function written in the ROM 9 in an actual field measurement is calculated after a telescope is rotated up to 360° to check an origin in the increment encoder. When the main graduation 2 of the rotary encoder 1 is rotated, light from the light-emitting section 3 is transmitted through the slits of the main graduation 2 and received by the light-receiving section 5. The light-receiving section 5 outputs an electric signal to the counter or the A/D converter 7 depending on a light-and-shade pattern formed when the light is transmitted through the main graduation 2 and the subgraduation 4. The A/D converter 7 converts the electric signal from an analog signal into a digital signal, and outputs the digital signal to the CPU 6. The CPU 6 detects a detected angle θa of the graduation disk 2 on the basis of the digital signal, and substitutes the detected angle θa for the variables in the error function E(θ) stored in the ROM 9 to calculate an error E(θa) (E(θa) is a positive or negative value) included in the detected angle θa. An angle θa−E(θa) obtained by subtracting the error E(θa) from the detected angle θa is displayed on the display unit 8 as an accurate angle.

In this embodiment, the incremental rotary encoder has been described. However, the present invention can be applied to not only the incremental rotary encoder but also an absolute rotary encoder. More specifically, since the absolute encoder always detects an absolute angle from a predetermined reference position, this detection is equivalent to detection of an origin position O in the incremental encoder.

Figure 3:
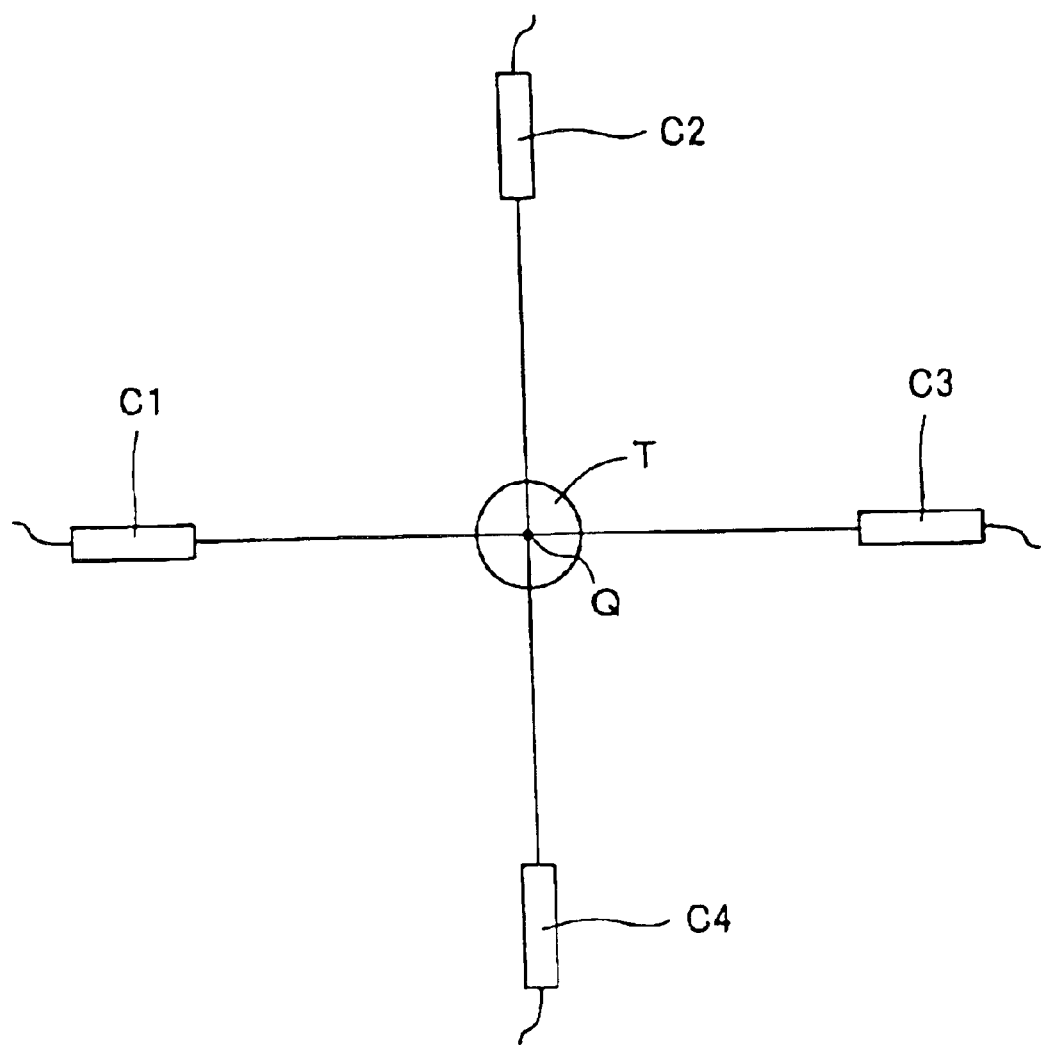
FIG. 3 is a plan view showing an angle error inspection system.

When, by using collimator etc. in FIG. 3 (in this case, collimator C1 to C4 are arranged in four directions), a pair of measurements (for example, with respect to these collimator, three pairs of measurements) are performed, an order i of an error function to be measured can be selected by adjusting the number of collimator to be installed. An encoder which adapts to an accuracy of respective targets can be manufactured. When an order terms which cause errors are combined to each other, an encoder which adapts to an accuracy of respective targets can be manufactured.

In order to determine a constant of an angle error by an encoder itself, as another inspection method, the following method is used. That is, a reference encoder having a known angle error is compared with the above encoder to measure an error, and constants of an error function obtained by the error can be determined.

In the embodiment of the present invention, the encoder is described as an encoder mounted on a surveying instrument. However, when the telescope section of surveying instrument is detachably arranged on the encoder, an encoder having a desired accuracy can be obtained as a single unit.

As is apparent from the above description, according to the present invention, an error function E(θ) is calculated on the basis of an error included in a detected angle of a rotary encoder which is measured in advance, and the detected angle is corrected on the basis of the calculated error function. For this reason, an angle error caused by an eccentricity etc. and a graduation error are eliminated by correction based on the error function without strictly adjusting hardware to reduce an eccentricity and an inclination of a graduation disk, and an accurate angle can be obtained.

Even though a cause of an error is not known, when the tendency of an error period can be known, the adverse affect of the error can be efficiently removed, and accurate angle measurement can be performed.

When an order of an error function is selected, measurement and correction of an angle error which are performed to satisfy an accuracy of respective targets can be efficiently performed. Advantageously, firmware need not have a table including a large angle error.

What is claimed is:

1. A rotary encoder comprising: a fixed section; a rotating section which can be rotated with reference to the fixed section; angle detecting means for detecting a rotation angle of the rotating section with reference to a predetermined reference position of the rotating section; and output means for outputting the detected angle, wherein, when the angle detecting means detects an angle θn=n×θs (n=1, 2, ..., N (where N×θs=360°)) which is an integer multiple of a predetermined angle θs (θs≧output resolution) such that the rotating section is rotated, an angle error E (θn) included in the detected angle θn is measured, functions between the detected angles θn and errors E(θn) are defined by the following equation with respect to all n:

$$E(\theta n) = \sum_{i=1}^{N/2} A_i \cdot \sin(i\theta n + \phi_i)$$

an amplitude $A_i$ and an initial phase $\phi_i$ (i=1, 2, ..., N/2 or (N−1)/2) are calculated such that all the defined equations are satisfied, storing means for storing an error function which is given by the following equation:

$$E(\theta) = \sum_{i=1}^{N/2} A_i \cdot \sin(i\theta + \phi_i)$$

and which is a periodic function of a detected angle θa having the calculated amplitude $A_i$ and the calculated initial phase $\phi_i$ as coefficients is arranged, the detected angle θa detected by the angle detection means is substituted for the variables θ in the equation of the error function E(θ) stored by the storing means, and a value obtained by subtracting the value E(θa) obtained by the substitution from the detected angle θa is outputted by the output means.

2. A rotary encoder comprising: a fixed section; a rotating section which can be rotated with reference to the fixed section; angle detecting means for detecting a rotation angle of the rotating section with reference to a predetermined reference position of the rotating section; and output means for outputting the detected angle, wherein, when the angle detecting means detects an angle θn=n×θs (n=1, 2, ..., N (where N×θs=360°)) which is an integer multiple of a predetermined angle θs (θs≧output resolution) such that the rotating section is rotated, an angle error E (θn) included in the detected angle θn is measured, combinations between the detected angles θn and errors E(θn) are defined by the following equation with respect to all n:

$$E(\theta n) = \sum_{i=1}^{N/2} A_i \cdot \sin(i\theta n + \phi_i)$$

an amplitude $A_i$ and an initial phase $\phi_i$ (i=1, 2, ..., N/2 or (N−1)/2) are calculated such that all the defined equations are satisfied, storing means for storing an error function which is given by the following equation:

$$E(\theta) = \sum_{i=1}^{m} A_{k\,i} \cdot \sin(k\,i\,\theta + \phi_{k\,i})$$

and which is a periodic function of the detected angle θa having at least one amplitude $A_{k1}, A_{k2}, \ldots, A_{km}$ and at least one initial phase $\phi_{k1}, \phi_{k2}, \ldots, \phi_{km}$ (k1, k2, …, km is at least one of natural numbers from 1 to N/2 or (N−1)/2) of the calculated amplitudes $A_i$ and the calculated initial phases $\phi_i$ as coefficients is arranged, the detected angle θa detected by the angle detection means is substituted for the variables θ in the equation of the error function E(θ) stored by the storing means, and a value obtained by subtracting the value E(θa) obtained by the substitution from the detected angle θa is outputted by the output means.

* * * * *